United States Patent
Aumiller

(10) Patent No.: US 11,670,925 B2
(45) Date of Patent: Jun. 6, 2023

(54) HOLDING DEVICE FOR HOLDING A SHIELDED CABLE

(71) Applicant: AGRO AG, Hunzenschwil (CH)

(72) Inventor: Markus Aumiller, Hunzenschwil (CH)

(73) Assignee: AGRO AG, Hunzenschwil (CH)

( * ) Notice: Subject to any disclaimer, the term of this patent is extended or adjusted under 35 U.S.C. 154(b) by 850 days.

(21) Appl. No.: 16/489,596

(22) PCT Filed: Dec. 21, 2017

(86) PCT No.: PCT/EP2017/084048
§ 371 (c)(1),
(2) Date: Aug. 28, 2019

(87) PCT Pub. No.: WO2018/157962
PCT Pub. Date: Sep. 7, 2018

(65) Prior Publication Data
US 2020/0076175 A1    Mar. 5, 2020

(30) Foreign Application Priority Data
Mar. 3, 2017 (CH) .................................... 00264/17

(51) Int. Cl.
*H02G 3/06*   (2006.01)
*H02G 3/04*   (2006.01)

(52) U.S. Cl.
CPC ......... *H02G 3/0666* (2013.01); *H02G 3/0406* (2013.01); *H02G 3/0456* (2013.01)

(58) Field of Classification Search
CPC ....... F16L 3/12; H02G 3/0675; H02G 3/0666; H01R 13/6583; H01R 13/187; H01R 13/111

(Continued)

(56) References Cited

U.S. PATENT DOCUMENTS 4,493,522 A * 1/1985 Law .................... H02G 15/04
                                                        439/271
5,432,301 A * 7/1995 Gehring ................ D04C 1/06
                                                        174/88 C (Continued)

FOREIGN PATENT DOCUMENTS

AU           6153973 A    4/1975
CN        103262371 A    8/2013

(Continued)

OTHER PUBLICATIONS

International Search Report for corresponding PCT application No. PCT/EP2017/084048, dated Apr. 12, 2018.

*Primary Examiner* — Timothy J Thompson
*Assistant Examiner* — Michael F Mcallister
(74) *Attorney, Agent, or Firm* — GrowIP Law Group LLC

(57) ABSTRACT

An example threaded cable connector for a cable with a conductor and a surrounding shielding braid, comprising a base element, a first tightening nut and a first clamping element is presented herein. The base element includes a base for fastening the base element to a housing and a passage opening for the passage of the cable about which an encircling first thread is oriented. On a side facing away from the housing, the base element has a contact surface encircling the passage opening. The first tightening nut comprises a second thread for operatively connecting the first tightening nut to the first thread of the base element. The first clamping element has a first clamping surface and, in the mounted state, is arranged between the contact surface and the first tightening nut. The first clamping element, in the mounted state, presses the shielding braid against the contact surface.

20 Claims, 4 Drawing Sheets

(58) Field of Classification Search
USPC .......................................................... 174/653
See application file for complete search history.

(56) References Cited

U.S. PATENT DOCUMENTS

| | | | | |
|---|---|---|---|---|
| 5,927,892 | A * | 7/1999 | Teh-Tsung | H02G 3/0675 403/259 |
| 7,183,486 | B2 * | 2/2007 | Pyron | H01R 13/5219 174/59 |
| 2002/0006309 | A1 * | 1/2002 | Bartholoma | F16L 41/14 403/194 |
| 2005/0077722 | A1 * | 4/2005 | Kiely | H02G 3/0675 285/382.7 |
| 2007/0017688 | A1 * | 1/2007 | Pyron | H01R 13/5219 174/59 |
| 2010/0059989 | A1 * | 3/2010 | Kiely | F16L 19/075 285/151.1 |
| 2013/0256467 | A1 * | 10/2013 | Aumiller | H02G 3/0675 248/49 |
| 2015/0200530 | A1 * | 7/2015 | Chiu | H02G 15/013 174/653 |
| 2015/0200531 | A1 * | 7/2015 | Chiu | H02G 15/013 277/607 |
| 2019/0170253 | A1 * | 6/2019 | Binder | H02G 3/06 |

FOREIGN PATENT DOCUMENTS

| | | |
|---|---|---|
| DE | 9000794 U1 | 3/1990 |
| EP | 0528534 B1 | 4/1997 |
| GB | 666004 * | 5/1950 |
| GB | 666004 A | 2/1952 |
| GB | 2214728 A | 9/1989 |
| GB | 2258567 A | 2/1993 |
| JP | S52128985 A | 10/1977 |
| JP | S5977278 U | 5/1984 |
| JP | H079038 U | 2/1995 |

* cited by examiner

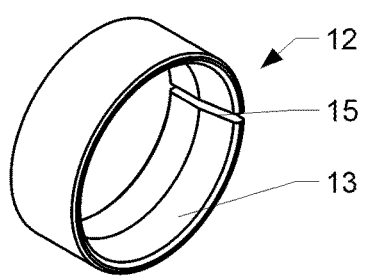
Fig. 5A
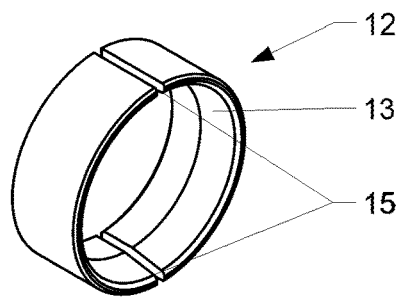
Fig. 5B
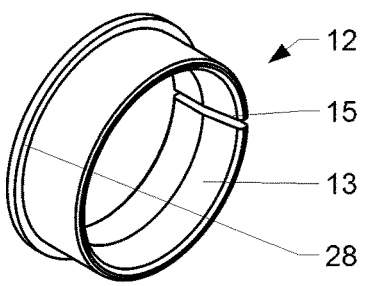
Fig. 5C
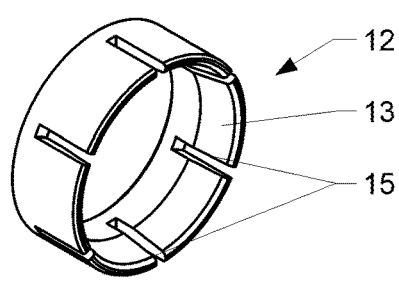
Fig. 5D
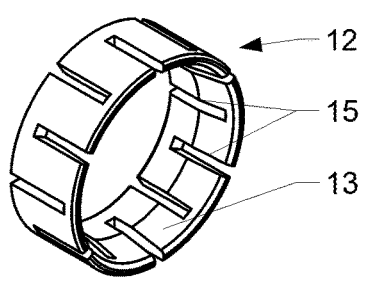
Fig. 5E
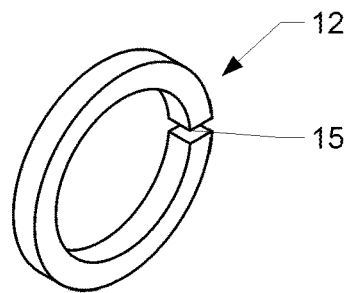
Fig. 5F
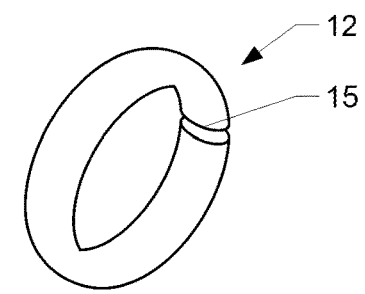
Fig. 5G
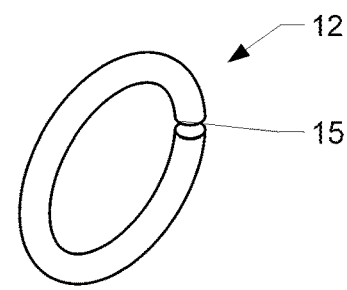
Fig. 5H
Fig. 5

US 11,670,925 B2

HOLDING DEVICE FOR HOLDING A SHIELDED CABLE

CROSS-REFERENCE TO RELATED APPLICATIONS

This application claims the benefit of the filing date of international PCT Application No. PCT/EP2017/084048, filed on Dec. 21, 2017 that in turn claims priority to Swiss Patent Application No. CH 00264/17, filed on Mar. 3, 2017, which are hereby incorporated by reference in their entirety.

TECHNICAL FIELD

The present invention relates to a holding device for holding a cable, in particular a grounding cable or shielding cable, as is typically used in cable bushings or cable entries on housings of appliances or switch cabinets.

BACKGROUND OF THE INVENTION

Holding devices for holding a cable can provide strain relief together with a sealing function of the cable electromagnetic shielding and dissipating line faults. For this purpose, the cable is axially secured in the holding device and an electrical contact with a cable shield is established, which usually consists of a shielding braid that is arranged underneath an external insulation (cable sheath) of the cable. Conventional holding devices generally comprise a sleeve-shaped base element that is arranged above a cable, a contact and/or clamping element which fixes the cable and, if necessary, can make contact with the cable shield, and a first tightening nut that can be connected to the base element and positions the contact/clamping element in the base part. The base element can be designed as a screw sleeve and can, for example, enter into a screwed connection with a housing such that the cable is fixed to the housing.

Threaded cable connectors have to ensure that the quality of the shielding is maintained at the sensitive connecting points and that there are no shielding losses. In this respect, it is necessary not only to use a maximally shielded line, but also to use threaded cable connectors that have good electromagnetic compatibilities. A very wide variety of holding devices is known from the prior art.

WO2012072318A1, filed by this applicant on Oct. 7, 2011, discloses a holding device for holding a cable, comprising a sleeve-shaped base part, a connection part which is connectable to the base part, and an elastically tightenable clamp part which is arranged between the base part and the connection part. The clamp part has elastically tightenable clamp braces that are suitable for clasping a cable, and at least one tightening wing that protrudes in an arc-shaped manner from a clamp brace and supports the clamp part in an elastically tightened manner against an inner circumferential surface of the base part.

DE1949189A1, published by Lapp K G on Apr. 1, 1971, discloses a cable bushing having a grounding device for cables with a metal braided sheath, in which the cable is pressed by a pressure screw into a lower part with the interconnection of a sealing ring. The pressure screw presses with a conical inner surface onto a multi-part, conical ring surrounding the metal braid. The ring, for its part, is thereby pressed onto a braid and onto an end expansion of the braid and thus clamps the metal braid.

DE3737345, published by Pflitsch GmbH and Co KG on May 24, 1989, relates to a device for the sealed laying of elastic lines which have an external shield in the form of a wire braid. The device consists of a double nipple with end-side threaded connectors, wherein the nipple has a push-in bore for a sealing and squeezing body. A pressure screw which pretensions the sealing body can furthermore be screwed onto the nipple. A ring part composed of electrically conductive material is arranged between the end surface of the sealing body and a stop collar, the ring part tapering conically from radially on the outside inward toward the insert opening of the nipple, and a grounding cable being fastened to that side of the ring part which is directed away from the insert opening.

DE1127426, published by Associated Electrical Industries on Apr. 12, 1962, discloses a stuffing box for reinforced electric cables consisting of at least three sections which can be screwed into one another and an externally conical, tapering clamping piece for trapping the armoring wires, the clamping piece being arranged between two sections, and sealing disks composed of pliant material.

The patent U.S. Pat. No. 543,230, published by Anton Hummel Verwaltungs GmBH on Jul. 11, 1995, relates to a screwed cable gland for grounding or shielding cables. The screwed cable gland has a screw sleeve composed of electrically conductive material, in particular of metal, and a mating sleeve which is connectable thereto and can be designed as a pressure connector or as a union nut. In order to fix a metal braid for grounding or shielding the cable interior, use is made of a clamping insert of insulating material that can be pressed against the cable by the screwed connection of the screw sleeve and mating sleeve. When a thread is tightened, clamping fingers and also a region between slots of the clamping insert are deformed radially toward the cable. The region of the clamping insert that faces away from the clamping fingers has an extension from which stripped wires of the metal braid protrude in the axial direction in order to produce the electrical connection. The protruding wires can be bent over outward around the end side of the extension, and therefore the wires are pressed fixedly against the inner side of the electrically conductive screw sleeve.

EP0817316, published by Sumito Wiring Systems on Jan. 7, 1998, discloses a connecting construction for connecting a shielding layer of a shielded cable. The latter has an inner tubular component which can be introduced into an exposed section of the shielding layer. Furthermore, there is a conductive outer tubular component which can be fitted onto the outer side of the shielding layer. The component can enter into engagement with the inner tubular component. The shielding layer is arranged in between in order to produce the electrical contact with the shielding layer.

Among the disadvantages of the screwed connections known from the prior art is that electrical currents that occur cannot be effectively dissipated to the housing by the cable shield.

SUMMARY OF THE INVENTION

It is an object of the present disclosure to solve at least one of the problems inherent to the prior art. A threaded cable connector according to the present disclosure may include a base element, a first tightening nut, and a first clamping element. The base element can further comprise a base that serves for the fastening and contacting the base element to a housing. A supporting surface of the base may be designed in such a manner that the supporting surface makes contact with the housing in one or more regions. The base element may be at least partially composed in an electrically conductive material. A passage opening for the passage of the cable can extend in the axial direction centrally in the base element. An encircling first thread can be arranged around the opening. On a side facing away from the base or the housing, the base element can further have a contact surface encircling the passage opening. The contact surface may establish an electrical contact. Currents occurring in the shielding braid can thus be effectively output directly to the housing via the one or more conductive regions of the base element and preferably via the supporting surface, which may also be conductive. Depending on the arrangement of the conductive regions of the base element, the electrical contact connection to the housing can therefore take place exclusively via the supporting surface, and, as a result, protect the fastening means for fastening the base element to the housing.

The first tightening nut can comprise at least one second thread for operatively connecting the first tightening nut to the first thread of the base element. The first clamping element, when in the mounted state, is arranged between the contact surface of the base element and the first tightening nut and has at least one first clamping surface. A variant with a plurality of first clamping surfaces that are distributed over the circumference of the shielding braid may also be used. When in the mounted state, the first clamping element may press the shielding braid arranged between the first clamping surface and the contact surface against the contact surface in order to establish a reliable electrical contact of the shield with the base element. The contact may be resistant to vibrations. Another advantage with this type of contact connection is that no forces from the contact connection may engage the conductor minimizing risk to the conductor.

The contact surface may be arranged in the radial direction as close as possible to the surface of the cable. In the present disclosure, the shielding braid, after emergence from a cable sheathing and prior to coupling against the contact surface, may be only slightly deformed by comparison to other screwed glands from the prior art. Possible fracture points that arise during deformations and that may lead to an inadequate transmission of currents to the contact surface can thus be avoided.

Alternatively, or additionally thereto, the contact surface can be directed conically outward. In this case, some examples may use the contact surface as a centering means for the first clamping element in relation to the base element.

The contact surface of the base element can be arranged, for example, in a groove of the base element with the groove extending in the axial direction. As described above, some examples may involve arranging the groove with the contact surface on the inside in the radial direction, i.e. in the vicinity of the surface of the cable. The groove can take on various forms within examples. Furthermore, the groove can be polygonally, annularly, or concentrically arranged about the center axis. An outer wall of the groove can furthermore serve as means for centering the first clamping element in relation to the base element.

The first thread can advantageously be arranged in the radial direction further on the outside than the contact surface or the groove. A threaded cable connector in which the axial position of the first thread and that of the contact surface overlap can likewise be advantageous and space-saving.

The first clamping element can be composed both of a conductive material, such as metal, and also of a non-conductive material, such as rubber or plastic. The electrical contact can thus be transmitted from the shielding braid via the contact surface to the conductive regions of the base element. When a flexible material is used for the first clamping element, the first clamping surface can be formed by the deformation. A rubbery, elastically deformable first clamping element can be deformed, for example by being pressed on, in such a manner that the clamping element adapts the shape of the contact surface and presses the shielding braid effectively and extensively against the latter.

The first clamping element is advantageously further configured to be radially deformable and/or radially resilient. This may be due to either material properties and/or can be achieved by the shaping of the first clamping element. As a result, the first clamping element can thus have, for example, at least one slot. The one or more slots can be oriented in the radial direction or in the axial direction. Similarly, the one or more slots can be configured continuously radially and/or in the axial directions such that, for example, an annular first clamping element obtains a C shape. Also first clamping elements that consist of a plurality of parts are possible.

The first clamping element is advantageously surrounded radially on the outside by a first receiving space. The latter can be formed by the groove or alternatively by the shaping of the base element and/or of the first tightening nut. The receiving space can be bounded at least partially in the axial direction by a shoulder that is formed on the first tightening nut and which presses the first clamping element axially against the contact surface. The first receiving space can serve to receive excess shielding braid and/or can provide space to allow radial deformation of the first clamping element outward. Excess shielding braid here is shielding braid that protrudes in the direction of the cable end behind the clamping between the contact surface and the first clamping surface. The excess shielding braid can be placed around the first clamping element and can be received by the receiving space that surrounds the first clamping element radially on the outside. In this case, the shielding braid is therefore placed around after it has provided the electrical contact to the contact surface. This is advantageous since damage to the shielding braid possibly arising by the deflection, or the kinking, of the shielding braid does not have an effect on the electrical path.

Additionally, thereto, the threaded cable connector according to the present disclosure can have a second clamping element that is suitable for clamping, or holding, the cable in the radial direction. The second clamping surface of the second clamping element can therefore at least partially lie against the outer sheath of the cable. The second clamping element can be at least partially accommodated here by a second receiving space in the first tightening nut. The first receiving space and the second receiving space are advantageously separated in the axial direction by a shoulder formed on the first tightening nut. The second receiving space is likewise divided preferably between the first tightening nut and a second tightening nut, wherein the second tightening nut fixes the second clamping element between the first tightening nut and the second tightening nut. For this purpose, the second tightening nut is designed such that it can be screwed via a fourth thread onto a third thread of the first tightening nut. The second clamping element can preferably have an axial stop for an end of a cable sheath of the cable and can thus position the latter in the axial direction.

Alternatively, or additionally thereto, the second clamping element can be of multi-part configuration. The multiple second clamping elements can be arranged here both radially one above another and also axially next to one another. An arrangement radially one above another can have the advantage that optimum adaptation to the respective cable diameter is possible by means of the multiple second clamping elements and therefore as good a clamping or holding action as possible is achieved.

An additional use of the second clamping element with the effect of a seal in order to seal the threaded cable connector against the cable is likewise conceivable. Use of further sealing elements is expedient in order to obtain more extensive sealing of the entire threaded cable connector.

For the installation of the threaded cable connector, all of the shielding braid of the cable be exposed at the cable end to be fastened. Furthermore, the threaded connector can then be prepared by the individual components of the threaded cable connector already being threaded onto the exposed cable in the sequence to be assembled: thus, in the case that a second tightening nut and a second clamping element are present, first, the second tightening nut and the second clamping element are slid onto the cable and subsequently then the first tightening nut and the first clamping element are slid onto the cable. Subsequently, the shielding braid can be expanded for preparation for the contact connection. The base element can then be pushed with the passage opening onto the cable end until the contact surface meets the expanded shielding braid of the cable end. The shielding braid is then secured by placing the first clamping surface of the first clamping element that has already been pushed onto the cable onto the shielding braid and fixed by screwing the first tightening nut pushed onto the cable on the base element and correspondingly clamping the shielding braid between the first clamping element and the base element. When the second clamping element and the second tightening nut have been threaded on, they can then likewise be pushed one after the other onto the already screwed part of the threaded cable connector and the second clamping element can be screwed onto the first tightening nut by the second tightening nut. The completely mounted threaded cable connector can then be screwed to the corresponding housing and can thus electrically connect the shielding braid via the base element to the housing.

BRIEF DESCRIPTION OF THE FIGURES

Aspects of the present disclosure will be explained in more detail with reference to the exemplary embodiments shown in the figures below and to the associated description. In the figures:

FIG. 5 shows a number of variants of first clamping elements according to the present disclosure.

DESCRIPTION OF THE EMBODIMENTS

Figure 1:
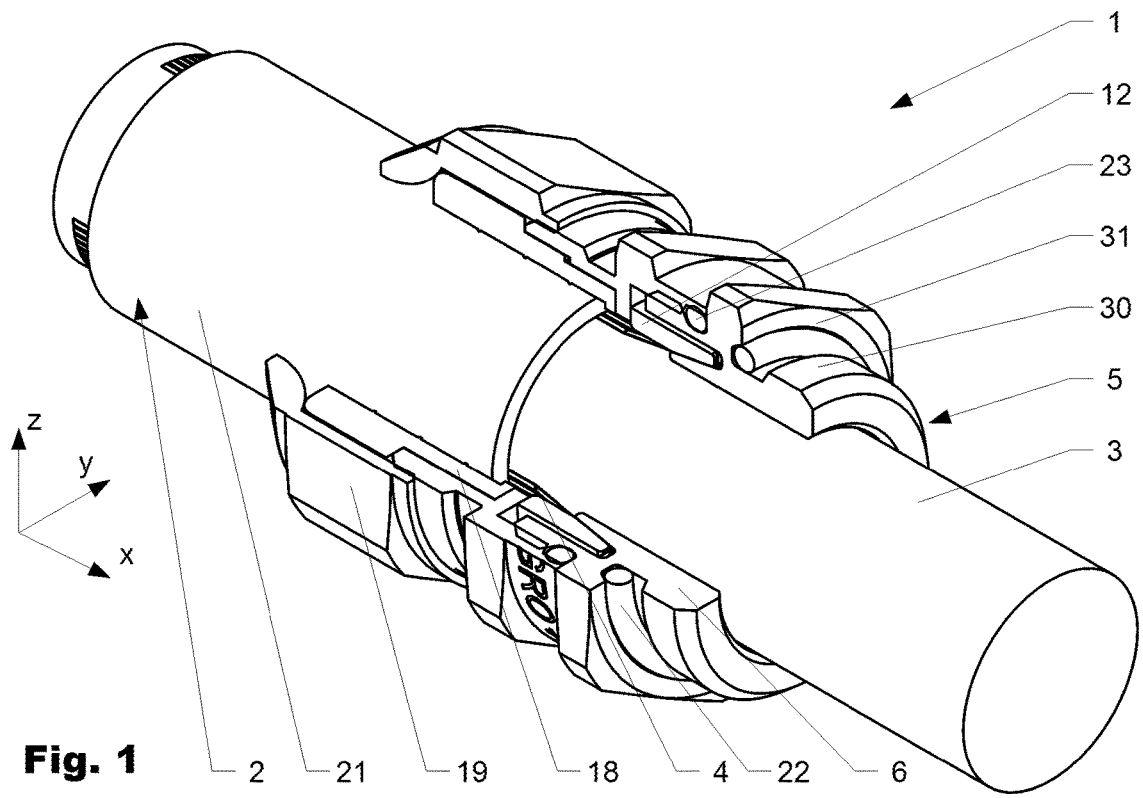
FIG. 1 shows a first embodiment of a threaded cable connector according to the present disclosure in a perspective and partially sectioned view.
Figure 2:
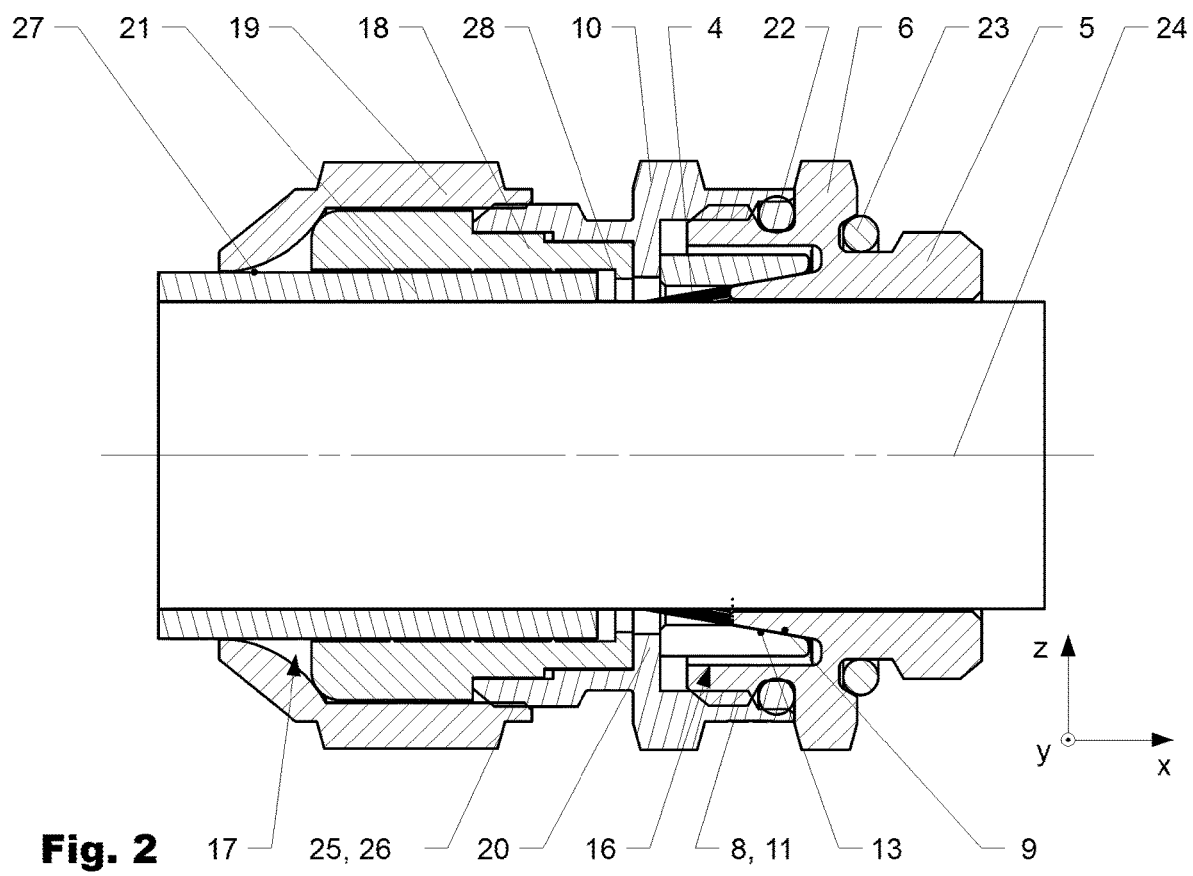
FIG. 2 shows the threaded cable connector according to FIG. 1 in a sectioned view.
Figure 3:
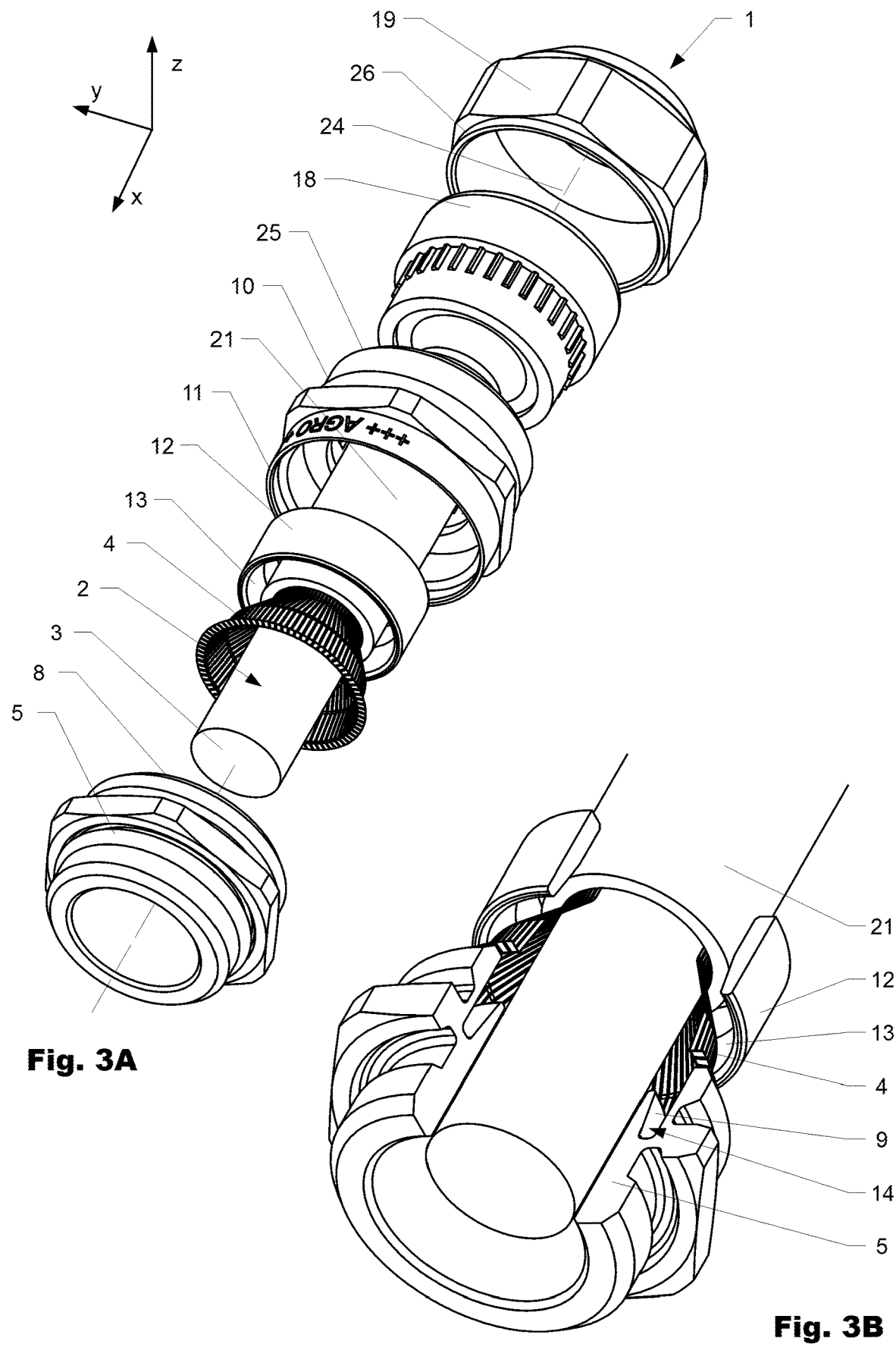
FIG. 3A shows the threaded cable connector according to FIG. 1 in a perspective exploded view.
FIG. 3B shows a partially sectioned detail from the exploded view according to FIG. 3A.

FIG. 1 shows a first variant of a threaded cable connector 1 according to the present disclosure in a perspective and partially sectioned view. FIG. 2 shows the same variant in a sectioned view, and FIG. 3A shows the latter in a perspective exploded view. FIG. 3B shows a detail of FIG. 3A that is illustrated in partially sectioned form for better understanding.

The first variant of the threaded cable connector 1 comprises a cable 2 with an inner conductor (not illustrated specifically) that is surrounded by a shielding braid 4. The threaded cable connector 1 furthermore comprises a base element 5, a first tightening nut 10 and a first clamping element 12 and also a second tightening nut 19 and a second clamping element 18. The base element 5 has a base 6 for the fastening and for the contact connection of the base element 5 to a housing (not illustrated specifically). A fastening means 30 for fastening the base 6 to the housing is provided on the base 6. Furthermore, a supporting surface 31 of the base 6 is designed in such a manner that it lies in one or more regions against the housing. To improve the contact connection, the contact surface, when required, can have protruding elements, e.g. points, etc. This has the effect that a primary electrical contact connection of the base element 5 to the housing can take place via the supporting surface 31. For this purpose, the base element 5 is composed at least in regions of an electrically conductive material in order to be able to produce an electrical connection between the contact surface 9 and the supporting surface 3, or the housing respectively. The base element 5 furthermore has a passage opening 7 extending in the axial direction (x direction) of the cable 2 for the passage of the cable 2, about which passage opening an encircling first thread 8 is oriented. On a side of the base element 5 that faces away from the base 6, or the housing respectively, there is a conical contact surface 9 around the passage opening 7. A first tightening nut 10 can be operatively connected to the first thread 8 of the base element 5 via a second thread 11. Furthermore, a first clamping element 12, in the mounted state, is arranged in the axial direction (x direction) between the contact surface 9 of the base element 5 and the first tightening nut 10 and has a first clamping surface 13. In a mounted state of the threaded cable connector 1, the first clamping element 12 serves for pressing the shielding braid 4 arranged between the first clamping surface 13 and the contact surface 9 against the contact surface 9. In the variant shown, the contact surface 9 is formed conically outward and is arranged in a groove 14 of the base element 5, the groove extending in the axial direction. The contact surface 9 tapers in a direction away from the base (negative x direction). In the variant shown, the groove 14 at least partially receives the first clamping element 12. It is apparent in FIG. 2 that the axial position of the first thread 8 and that of the contact surface 9 can overlap. This variant is, inter alia, particularly space-saving. In the first shown variant, the first clamping element 12 is of annular configuration and has an (axially and radially) continuous slot 15. The slot 15 allows, inter alia, the first clamping element 12 to be deformed in the radial direction. However, the deformation is advantageously resilient, and therefore the first clamping element 12 returns again after the deformation into its original (non-deformed) shape. Alternative embodiments of the first clamping element 12 are illustrated in FIG. 5.

A first receiving space 16 can be situated radially outside the first clamping element 12. The first receiving space can be formed by the groove 14 or alternatively by the shaping of the base element 5 and/or of the first tightening nut 10. The first receiving space 16 serves firstly to provide the first clamping element 12 with the possibility of being deformed radially outward. The receiving space can be at least partially bounded in the axial direction by a shoulder 20 which is formed on the first tightening nut 10 and presses the first clamping element 12 axially against the contact surface 9. Furthermore, the first receiving space 16 can likewise serve to receive excess shielding braid 4. The excess shielding braid can then be placed around the first clamping element 12 and received (not illustrated) by the first receiving space 16.

In the shown variant, a second tightening nut 19 is connectable to the first tightening nut 10. For this purpose, the first tightening nut 10 can have an additional third thread 25 that serves for operatively connecting to a fourth thread 26 of the second tightening nut 19. Together with the second tightening nut 19, the first tightening nut 10 forms a second receiving space 17 for receiving a second clamping element 18. The first receiving space 16 and the second receiving space 17 can be separated in the axial direction by the shoulder 20. The second clamping element 18 here uses its radially inwardly oriented second clamping surface 27 to clamp the outer sheath 21 and therefore achieves appropriate fixing of same. The second clamping element 18 can furthermore have a radial step 28 on its inner side, said step being adjacent to the second clamping surface 27 and providing an axial stop for the edge of the outer sheath 21 of the cable 2. The second clamping element 18 can be further used to the effect that it at the same time seals the threaded cable connector 1 against the cable 2. In addition, thereto, there can be a further first sealing element 22 for sealing the passage opening 7 against the housing and a second sealing element 23 for sealing the base element 5 against the first tightening nut 10. The two sealing elements 22, 23 are designed as a sealing ring in the shown variant.

Figure 4:
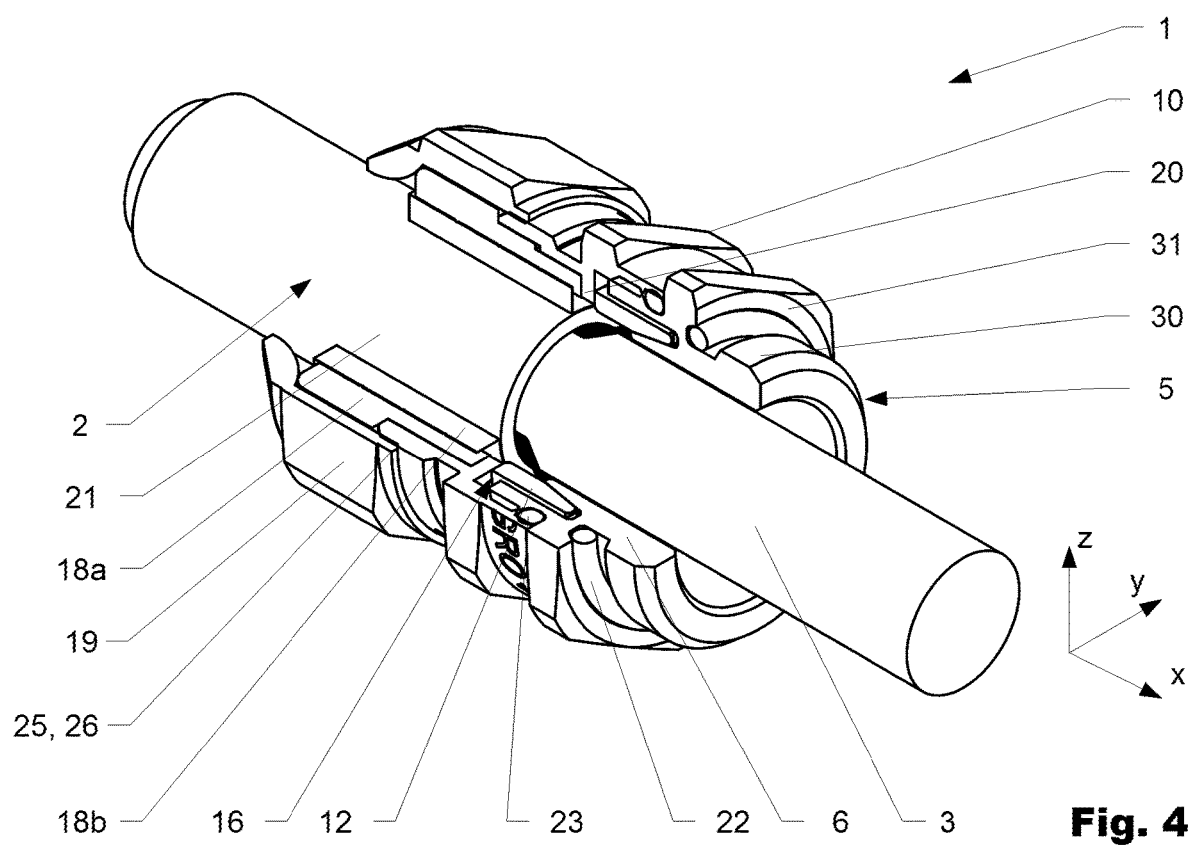
FIG. 4 shows a second embodiment of a threaded cable connector according to the present disclosure in a perspective and partially sectioned view.

FIG. 4 shows a second variant of the threaded cable connector 1 according to the present disclosure. The latter differs from the previously shown first variant in that the second clamping element 18 is of multi-part configuration and there are multiple second clamping elements 18a, 18b, which are arranged radially above one another. This design has the advantage that the second clamping element 18b can be exchanged depending on the cable diameter and therefore an optimum clamping action or additional sealing action can be produced.

FIG. 5 shows a selection of further possible variants of the first clamping element 12. While an annular, slotted first clamping element 12 having a conical first clamping surface 13 is shown in FIG. 5A, the first clamping element in FIG. 5B is slotted twice or is configured in multiple parts. FIG. 5C shows a first clamping element 12 with a slot 15 and a circumferential edge 29. As an alternative thereto, variants of the first clamping element that have multiple slots that are not continuous in the axial direction are depicted in FIG. 5D and FIG. 5E. The slots can extend in the axial direction (FIG. 5D) or can extend from different directions, e.g. in an alternating manner, in to the first clamping element 12 (FIG. 5E). FIGS. 5F-5H show variants that are each formed from a deformable material. The shown variants have a slot 15. However, the use of the deformable material makes it possible to also entirely omit the slot 15 since deformation is basically also possible without the shaping. Furthermore, the shown variants of the clamping element 12 do not have a conically inwardly directed first clamping surface 13. By means of the use of deformable material, the clamping element is deformed by the clamping action applied by the first tightening nut 10 in such a manner that a first clamping surface 13 is first formed in the deformed state.

The invention claimed is:

1. A threaded cable connector for a cable having at least one conductor and a shielding braid surrounding the latter, comprising
   a. a base element comprising:
      a base for fastening the base element to a housing, wherein the base element is composed at least in regions of an electrically conductive material;
      a passage opening extending in the axial direction of the cable for the passage of the cable;
      a first thread encircling the passage opening; and
      a contact surface encircling the passage opening;
   b. a first tightening nut with a second thread for operatively connecting the first tightening nut to the first thread of the base element; and
   c. a first clamping element with a first clamping surface which, in the mounted state, is arranged in the axial direction between the contact surface of the base element and the first tightening nut, wherein the first clamping element, in the mounted state, serves for pressing the shielding braid arranged between the first clamping surface and the contact surface against the contact surface.

2. The threaded cable connector of claim 1, wherein the contact surface is arranged in a groove of the base element, and wherein the groove extends in the axial direction.

3. The threaded cable connector of claim 2, wherein the contact surface and an outer wall of the groove serves for centering the first clamping element in relation to the base element.

4. The threaded cable connector of claim 1, wherein the first thread is arranged in the radial direction further on the outside than the contact surface.

5. The threaded cable connector of claim 1, wherein the axial position of the first thread and the axial position of the contact surface overlap.

6. The threaded cable connector of claim 1, wherein the contact surface is directed conically outward.

7. The threaded cable connector of claim 1, wherein the first clamping element comprises a conductive or a non-conductive material.

8. The threaded cable connector of claim 7, wherein the first clamping element comprises one or more of rubber, metal, and plastic.

9. The threaded cable connector of claim 1, wherein the first clamping element is annular.

10. The threaded cable connector of claim 1, wherein the first clamping element includes a slot.

11. The threaded cable connector of claim 1, wherein the first clamping element comprises a plurality of parts.

12. The threaded cable connector of claim 1, wherein the first clamping element is radially deformable.

13. The threaded cable connector of claim 1, wherein the first clamping element is resilient in the radial direction.

14. The threaded cable connector of claim 1, wherein the first clamping element is surrounded radially on the outside by a first receiving space.

15. The threaded cable connector of claim 14, wherein the first receiving space serves for receiving excess shielding braid.

16. The threaded cable connector of claim 1, wherein the first tightening nut has a second receiving space for receiving a second clamping element, which is suitable for clamping the cable in the radial direction.

17. The threaded cable connector of claim 16, wherein the first receiving space and the second receiving space are separated in the axial direction by a shoulder formed on the first tightening nut.

18. The threaded cable connector of claim 17, wherein the second clamping element is fixed by means of a second tightening nut between the first tightening nut and the second tightening nut.

19. A method for installing a threaded cable connector according to claim 1, comprising:
  providing the threaded cable connector;
  providing a cable with a conductor and an exposed shielding braid surrounding the conductor;
  threading a first tightening nut and a first clamping element onto the cable;
  expanding the shielding braid;
  pushing the expanded shielding braid over a contact surface of a base element;
  coupling a first clamping surface of the first clamping element onto the cable against the shielding braid; and
  screwing the first tightening nut pushed onto the cable onto the base element.

20. The method of claim 19, wherein prior to coupling the first tightening nut and the first clamping element, a second tightening nut is threaded onto the cable along with the second clamping element.

* * * * *